Nov. 10, 1970 YOICHI TSUCHIYA 3,539,734

AUTOMATIC TAPE RECORDER OPERATING SYSTEM

Filed March 6, 1968

INVENTOR
Yoichi Tsuchiya

BY Hill, Sherman, Meroni, Gross & Simpson
ATTORNEY

United States Patent Office 3,539,734

Patented Nov. 10, 1970

3,539,734

AUTOMATIC TAPE RECORDER OPERATING SYSTEM

Yoichi Tsuchiya, Tokyo, Japan, assignor to Teac Corporation, Tokyo, Japan, a corporation of Japan Filed Mar. 6, 1968, Ser. No. 710,960
Claims priority, application Japan, Mar. 18, 1967, 42/16,900
Int. Cl. G11b *21/08, 27/30, 15/44*
U.S. Cl. 179—100.2 4 Claims

ABSTRACT OF THE DISCLOSURE

This specification discloses an automatic tape recorder operating system using a pre-recorded magnetic tape including a plurality of tracks and having cue signals recorded in two of said plurality of tracks at a predetermined position in a recording mode different in respect of phase from that of information signals recorded in said two tracks, thereby automatically reversing the direction of transportation of said magnetic tape upon reproduction of said cue signals.

BACKGROUND OF THE INVENTION

This invention relates to an automatic tape recorder operating system which can be effectively applied in the case where two-way recording/reproduction are to be effected by automatically reversing the direction of transportation of a magnetic tape when a predetermined position is reached, in the case where the magnetic tape is to be automatically stopped at a predetermined position, or in the case where the magnetic tape is to be fast-forwarded or rewound at a predetermined position while it is being transported for recording or reproduction.

Conventionally, there has been widely adopted a system wherein use is made of a four-track magnetic tape, for example, and in the case where the recording of stereo-signals in first and third tracks or reproduction therefrom is to be followed by the recording in second and fourth tracks or reproduction therefrom, the magnetic tape is first transported to the right (or left) so that the stereo-signals are recorded in the first and third tracks or reproduced therefrom, and then the magnetic tape is reversed to be transported to the left (or right) at the position where the recording or playback ends up, so that the stereo-signals are recorded in the second and fourth tracks or reproduced therefrom. This system is well suited to long-period recording or playback since it is not necessary to rewind the magnetic tape.

In the foregoing system, the following means have been most widely utilized to change the direction of transportation of a magnetic tape from the left (or the right) to the right (or the left). That is, with the first means, an electrically conductive foil is applied on the magnetic tape at a position where the direction of transportation of the magnetic tape is to be reversed, contacts to be shorted by the electrically conductive foil are provided in the tape recorder, and a circuit for reversing the tape drive is controlled on the basis of the fact that the contacts are shorted by the electrically conductive foil. With the second means, a signal (cue signal) for automatically reversing the direction of transportation of a magnetic tape is pre-recorded on the magnetic tape at a position where the latter is to be reversed, and a tape drive reversing circuit is controlled by the cue signal reproduced. However, the first means using the electrically conductive foil is disadvantageous in that the magnetic tape tends to be scratched by the contacts, and the second means using the cue signal has such drawbacks that even if the cue signal is of an extremely low frequency such for example as that on the order of 10 cycles per second, such frequency component may be contained in recording or playback signals so that there may occur an erroneous operation, and a sophisticated and expensive filter is required for extracting the cue signal.

In the foregoing, it has been described that two different means, that is, the first means using an electrically conductive foil and the second means using a cue signal are available for the case where subsequent to the recording of stereo-signals in the first and third tracks of a magnetic tape or reproduction therefrom, the direction of transportation of magnetic tape is automatically reversed at a position where the recording or reproduction ends up, so that the stereo-signals are recorded in the second and fourth tracks or reproduced therefrom. The aforementioned first or second means has also been used to reverse the direction of transportation of a magnetic tape capable of being formed with first and second tracks in the case where subsequent to the recording of monaural signals in the first track or reproduction therefrom, the magnetic tape is to be automatically reversed at a position where the recording in the first track or reproduction therefrom ends up so that monaural signals are recorded in the first track or reproduced therefrom. In such case, too, drawbacks similar to those described above occur.

In order to stop the magnetic tape while it is being transported for recording or playback, a stop circuit provided in the tape drive means are also controlled by either the first means using the electrically conductive for or the second means using the cue signal. However, in this case, too, both of these two means represent disadvantages similar to those described above.

It is also conceivable that either one of the two means described above is utilized to fast-forward or rewind a magnetic tape when a predetermined position is reached while the tape is being transported for recording or reproduction. However, it is impossible to avoid the aforementioned drawbacks in this case, too.

SUMMARY OF THE INVENTION

It is a primary object of this invention to provide an automatic tape recorder operating system wherein a cue signal is employed to reverse and control the transportation of a magnetic tape in the case where while a magnetic tape having a plurality of tracks is being transported for recording in at least one of said plurality of tracks or reproduction therefrom, it is to be reversed when a position where the recording or reproduction ends up is reached, and recording or reproduction is to be effected with respect to at least one of the remaining tracks, in the case where while a magnetic tape is being transported for recording or reproduction, it is to be stopped when a predetermined position is reached, or in the case where while a magnetic tape is being transported for recording or reproduction, it to be fast-forwarded or rewound when a predetermined positions is reached, said system using a novel method of recording and reproducing the cue signal so as to be freed from the aforementioned drawbacks encountered in the use of the conventional means using a cue signal.

Another object of this invention is to provide an automatic tape recorder operating system using a magnetic recording tape including four tracks and having stereo-signals recorded in two of said tracks while the magnetic tape is being transported in a first direction, a cue signal for reversing the direction of transportation of the magnetic tape recorded at the end position of the tracks and stereo-signals recorded in the other two tracks while the magnetic tape is being transported in a second direction, wherein the stereo-signals are reproduced from the first two tracks during the transportation of the magnetic tape in the first direction, and said magnetic tape is subsequently reversed to be transported in the second direction in accordance with said cue signal so that the stereo-signals in said other two tracks are reproduced therefrom, said system using a novel method of recording and reproducing the cue signal so as to be freed from the aforementioned drawbacks encountered in the use of the conventional means using a cue signal.

A further object of this invention is to provide a novel automatic tape recorder operating system using a magnetic recording tape including a plurality of tracks and having cue signals recorded at predetermined positions of two of said plurality of tracks in a recording mode different in respect of phase from that of two information signals recorded in said two tracks, wherein the information signals recorded in the two tracks are reproduced by two magnetic heads associated with said two tracks in such a manner they are phasewise offset while the cue signals are additively reproduced so that they may be accurately detected, thus controlling the transportation of said prerecorded magnetic tape in accordance with said cue signals.

A still further object of this invention is to provide a novel automatic tape recorder operating system using a pre-recorded magnetic tape including four tracks and having cue signals thereon at predetermined position of two of said four tracks, wherein subsequent to the reproduction with respect to the first two tracks as the magnetic tape is transported in a first direction, the tape is reversed to be transported in a second direction by said cue signals so that reproduction is effected with respect to the other two tracks, and the cue signals are prevented from being unnecessarily mixed into the reproduced information signals.

Other objects, features and advantages of this invention will become apparent from the following description taken in conjunction with the accompanying drawings.

DESCRIPTION OF THE PREFERRED EMBODIMENT

Figure 1:
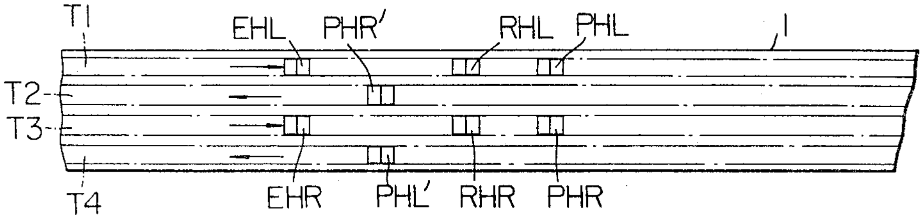
FIG. 1 is a view showing the arrangement of magnetic heads useful for explaining the automatic tape recorder operating system according to an embodiment of this invention.
Figure 2:
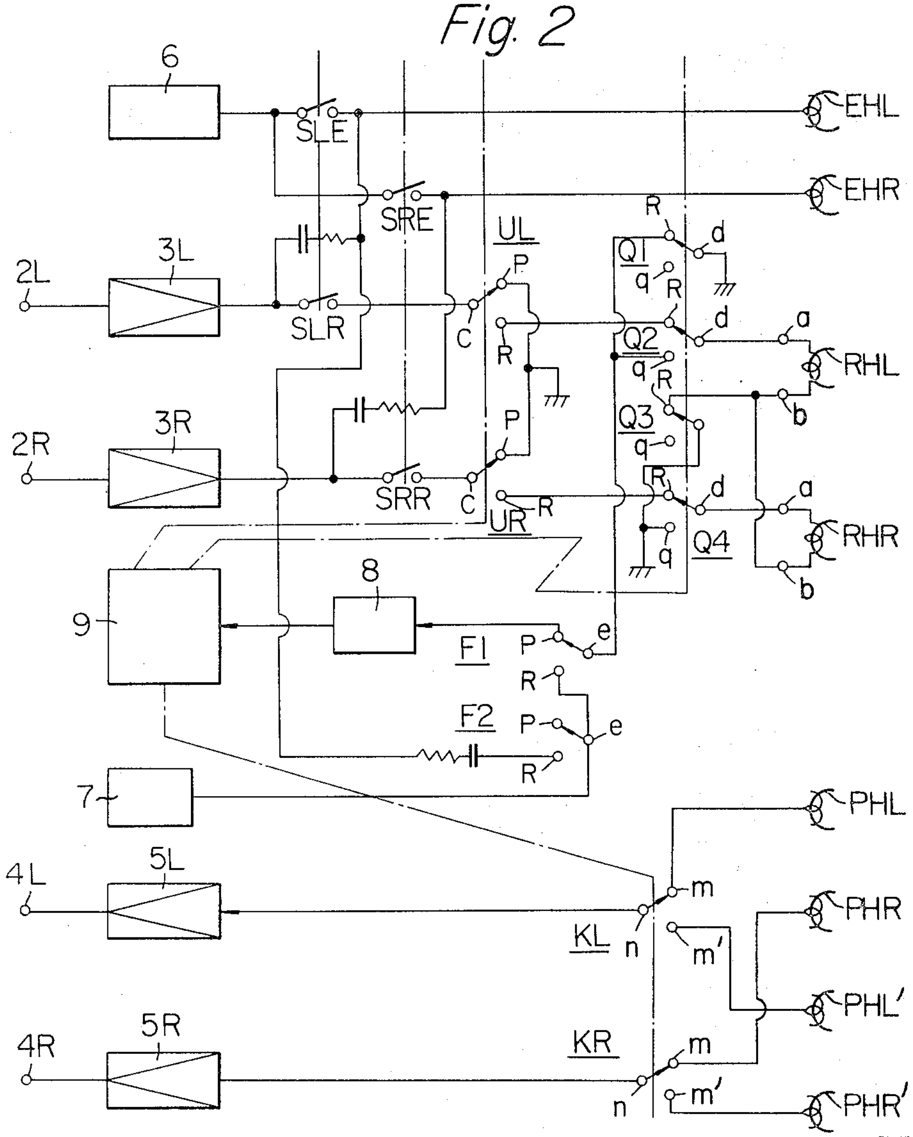
FIG. 2 is a schematic diagram showing by way of example the present automatic tape recorder operating system as being applied in the case of the head arrangement as shown in FIG. 1.

FIGS. 1 and 2 show the case where the present invention is applied to a stereophonic tape recorder using a magnetic tape having four tracks and the direction of transportation of the magnetic tape is reversed.

Referring to FIG. 1, the reference numeral 1 represents a magnetic tape having first, second, third and fourth tracks T1, T2, T3 and T4.

Magnetic record heads RHL and RHR are provided at positions corresponding to the first and third tracks T1 and T3 in widthwise alignment with each other.

Magnetic playback heads PHL and PHR are provided at other positions also corresponding to the first and third tracks T1 and T3 on the right hand side, for example, relative to the magnetic record heads PHL and PHR in widthwise alignment with each other, and other magnetic playback heads PHR′ and PHL′ are provided at positions corresponding to the second and fourth tracks on the left hand side relative to the magnetic record heads PHL and PHR in width-wise alignment with each other. Furthermore, magnetic erase heads EHL and EHR are provided at positions corresponding to the first and third tracks T1 and T3 on the left hand side relative to the magnetic record heads RHL and PHR.

The magnetic record heads RHL and PHR are adapted to effect normal stereo-signal recording, cue signal recording and cue signal reproduction, each of which is provided with two terminals *a* and *b*, as shown in FIG. 2.

In FIG. 2, 2L and 2R denote "right" and "left" stereo-signal input terminals, respectively, from which the "left" and "right" stereo-signals are supplied to "left" and "right" channel recording amplifiers 3L and 3R, respectively. 4L and 4R represent "left" and "right" stereo-signal output terminals, respectively. "Left" and "right" channel playback amplifiers 5L and 5R provide "left" and "right" stereo-signals, respectively. The reference numeral 6 indicates an erase and bias signal generating circuit.

The reference numeral 7 represents a cue signal source. The cue signal provided by the cue signal source 7 may be one having a frequency equal to that of the commercially available power source, and hence the cue signal source 7 may be constituted by part of a power supply transformer usually included in a tape recorder. Such cue signal source may also be constructed so as to produce a signal of low frequency such as 10 to 20 c./s. The cue signal from the cue signal source 7 is recorded on the magnetic tape 1 at predetermined positions by means of the magnetic record heads RHL and RHR, as will be described hereinafter. The reference numeral 8 represents a cue signal playback amplifier which preferably includes a band-pass filter for the cue signal. Reproduced cue signal provided by the cue signal playback amplifier 8 controls a magnetic tape drive reversing circuit, as will become apparent later.

A command-control circuit 9 comprises a control device for the electric circuitry of the recording and playback amplifier system including operating buttons for switches and change-over means, relay circuits and the like, and a magnetic tape drive means including an electric and mechanical system for controlling the magnetic tape transportation to transport the magnetic tape for recording or reproduction, reverse the direction of transportation of the magnetic tape or stop the latter.

SLR and SLE denote "left" channel selecting push-button switches to be used to start the recording operation and adapted for interlocking with each other. SRR and SRE represent "right" channel selecting push-button switches to be used to start the recording operation and adapted for interlocking with each other.

UL and UR indicate "left" and "right" channel recording-playback change-over switches adapted for interlocking with each other, each of which having recording contact R, a playback contact P and a movable contact C adapted for selective engagement with the contacts R and P. These change-over switches may be the relay contacts provided in control circuit 9, for example.

Q1, Q2, Q3 and Q4 are change-over switches provided on the input sides of the magnetic record heads RHL and RHR in interlocking relationship with each other, each of these change-over switches Q1, Q2, Q3 and Q4 comprising a contact *q* for the recording and reproduction of a cue signal, a contact R for normal recording and a movable contact *d* adapted for engagement with the contacts *q* and R. These change-over switches may be relay contacts provided in the control circuit 9, for example.

F1 and F2 represent cue signal recording-playback change-over switches adapted for interlocking with each other, each of which comprises a recording contact R, playback contact P and movable contact *e* adapted for engagement with contacts R and P. It is preferable that the movable contact *e* is normally disposed in engagement with the playback contact P and that it is brought into engagement with the recording contact through push-button type actuation when the recording operation is to be initiated.

KL represents a change-over switch for the playback heads PHL and PHL′, and KR denotes a change-over switch for the playback heads PHR and PHR′. These change-over switches are adapted for interlocking with each other, each of which comprises contacts *m* and *m'* and a movable contact *n* adapted for engagement with the contacts *m* and *m'*, and they may be relay contacts provided in the control circuit 9.

The connections of the respective circuits, switches etc. can be described in connection with their operations as follows:

Description will first be made of the case where "left" and "right" stereo-signals are recorded on the magnetic tape 1.

(a) Switches SLR, SLE and SRR, SRE are closed.

(b) Change-over switches UL and UR have the movable contact *c* brought into engagement with the recording contact R.

(c) Change-over switches Q1, Q2, Q3 and Q4 have the movable contact *d* brought into engagement with the recording contact R.

(d) Change-over switches F1 and F2 have the movable contact *e* brought into engagement with the playback contact P.

While the magnetic tape 1 is being transported to the right as viewed in FIG. 1 under the conditions (a) to (d), the "left" signal is supplied from the "left" channel input terminal 2L to the magnetic record head RHL through the system of recording amplifier 3L—switches SLR—contacts C and R of the change-over switch UL—contacts R and *d* of the change-over switch Q2—terminal *a* of the magnetic head RHL—terminal *b*—contacts R and *d* of the change-over switch Q3—earth, so that the "left" signal is recorded in the first track T1. Simultaneously with the recording in the track T1, on the other hand, the "right" signal is supplied from the "right" channel input terminal 2R to the magnetic record head RHR through the system of recording amplifier 3R—switch SRR—contacts C and R of the change-over switch UR—contacts R and *d* of the change-over switch Q3—earth, so that it is recorded in the third track T3 of the magnetic tape 1.

In this case, the erasing signal from the erase and bias signal source 6 is supplied to the erase heads EHL and EHR through the switches SLE and SRE respectively, and the bias signal is supplied to the connection points between the switch SLR and the amplifiers 3L, and between the switch SRR and the amplifiers 3R through the switches SLE, and SRE respectively. Thus, the bias signal is applied to the magnetic heads RHL and RHR through the aforementioned system for the "left" and "right" signals.

Consequently, the stereo signal is parallelly recorded on the magnetic tape 1 with the "left" signal in the first track T1 and with the "right" signal in the third track T3, as in the usual case.

In case a stereo signal is recorded in the second and fourth tracks of the magnetic tape 1 subsequent to the recording in the first and third tracks T1 and T3, the transportation of the magnetic tape is stopped, the magnetic tape is now placed up-side-down so that the former supplying side becomes the winding side (the tape is not rewound), and the magnetic tape 1 is again transported. Thus, the "left" and "right" signals are recorded in the fourth and second tracks of the magnetic tape 1 through the same system as described above.

In order to automatically reverse the direction of transportation of the magnetic tape during the playback operation, the present invention intends to record a cue signal on the magnetic tape at a position where the reversal of the tape transporting direction is to be carried out, or at a position where the recording in the first and third tracks T1 and T3 ends up. To this end, the movable contacts *d* of the change-over switches Q1, Q2, Q3 and Q4, are brought into contact with the contacts *q* for the cue signal, thereafter the movable contacts *d* of the change-over swiches F1 and F2 are engaged with the recording contacts R for a predetermined period of time, for example, 0.5 to 1 second, and the movable contacts *d* of the change-over switches F1 and F2 are immediately returned to the playback contacts R. Thus, a system of contacts R and *e* of the change-over switch F1—contacts *q* and *d* of the change-over switch Q2—terminal *a* of the magnetic record head RHL—terminal *b*—terminal *b* of the magnetic record head RHR—terminal *a*—earth is established, and the magnetic heads RHL and RHR are connected in series with each other, so that the cue signal is recorded in the first and third tracks T1 and T3. In this case, the bias signal is superimposed upon the cue signal in the path for the latter so as to be supplied to the magnetic heads RHL and RHR through the switch SLE—contacts R and *e* of the change-over switch F2. Consequently, the cue signal is properly recorded.

It is to be noted here that when the cue signals are recorded in the manner described above, they are recorded in a recording mode different in respect of phase from that of the stereo-signals which are recorded by the magnetic heads RHL and RHR.

In the case of the normal signal recording, the terminals *a* of the magnetic heads RHL and RHR serve as "hot" side, while the terminals *b* as "earth" side.

Thus, if signals of the same frequency and in phase with each other are supplied to the magnetic heads RHL and RHR, then these signals are recorded in the first and third tracks of the magnetic tape 1 in phase with each other.

In the recording of the cue signals, however, the magnetic heads RHL and RHR are connected in series with each other with their earth terminals *b* coupled to each other, so that the cue signals are recorded in the first and third tracks of the magnetic tape 1, 180° out of phase with each other. In this connection, it is to be noted that the cue signal recording mode is neither that the cue signals are parallelly supplied to the "hot" sides of the magnetic heads RHL and RHR so as to be recorded nor that cue signals 180° out of phase with each other are previously produced which are parallelly supplied to the "hot" sides of the magnetic heads RHL and RHR so as to be recorded.

In the recording of the cue signals, the movable contacts *c* of the change-over switches UL and UR may be engaged with any of the recording contacts R and playback contacts P, and the switch SRE may be opened.

After the recording of the cue signals has been effected in the above manner, stereo-signal recording may be carried out with respect to the second and fourth tracks with the tape placed up-side-down as described above. In this case, it is of course required that the movable contacts *c* of the change-over switches UL and UR be engaged with the recording contacts R, that the switches SLE and SRE be closed, and that the movable contacts *d* of the change-over switches Q1, Q2, Q3 and Q4 be engaged with the contacts R.

In the foregoing, description has been made of the order and operation in which subsequent to the recording with respect to the first and third tracks of the magnetic tape 1, recording is effected with respect to the second and fourth tracks, and the mode of recording the cue signals subsequent to the recording with respect to the first and third tracks. Mention will now be made of the case where reproduction is made with respect to magnetic tape having stereo-signals recorded thereon in the above manner.

(a) Switches SLE, SLR and SRE, SRR are opened.

(b) Movable contacts *c* of the change-over switches UL and UR are brought into engagement with the playback contacts P.

(c) Movable contacts *d* of the change-over switches Q1, Q2, Q3 and Q4 are brought into engagement with the cue signal playback contacts *q*.

(d) Movable contacts *e* of the change-over switches F1 and F2 are engaged with the playback contacts P.

(e) Movable contacts *n* of the change-over switches KL and KR are engaged with the contacts *m*.

If the magnetic tape 1 is transported to the right as viewed in FIG. 1 under the above conditions, the "left" and "right" stereo-signals recorded in first and third tracks T1 and T3 of the magnetic tape 1 are reproduced by means of the playback heads PHL and PHR, respectively. Thus, the "left" signal reproduced by the playback head PHL will appear at output terminal 4L through contacts *m* and *n* of the change-over switch KL and playback amplifier 5L, and the "right" signal reproduced by the playback head PHR will be available at output terminal 4R through contacts *m* and *n* of the change-over switth KR and playback amplifier 5R. At this time, the signals recorded in the first and third tracks are being reproduced by the magnetic heads RHL and RHR which now connect to the input of the cue signal amplifier 8 through contacts *p* and *e* of the change-over switch F1—contacts *q* and *d* of the change-over switch Q2—terminal *a* of the magnetic head RHL—terminal *b*—terminal *b* of the magnetic head RHR—terminal *a* contacts *d* and *q* of the change-over switch Q4—earth. In this case, however, the connections between the terminals of the magnetic heads RHL and RHR are the same as those for the case where the cue signals are to be recorded and not the same as those for the case where stereo-signals are to be recorded, and the stereo-signals recorded in the first and third tracks T1 and T3 are normally in phase. Hence, even if stereo-signals recorded in the first and third tracks have the same frequency as that of the cue signal, the cue signal amplifier 8 will not respond to such stereo-signals.

When that portion of the magnetic tape 1 in which the cue signals are recorded is reached, the cue signals are reproduced by the magnetic heads RHL and RHR in the same phase relationship as that when they were recorded. Thus, the cue signals in the first and third tracks are reproduced by the magnetic head RHL and RHR to be superimposed upon each other and then supplied to the cue signal amplifier 8 so as to be amplified therein. The output of the amplifier 8 is supplied to the control circuit 9.

The control circuit 9 controls the tape drive circuit so that the direction of transportation of the magnetic tape 1 is reversed, that is, the tape is now transported to the left as viewed in FIG. 1. Such control may be carried out through the connection in the electric circuitry for reversing the polarity of the capstan motor, for example. In this way, the direction of transportation of the magnetic tape 1 is automatically reversed.

Concurrently with the reversal of the tape transporting direction, the movable contacts *n* of the change-over switches KL and KR are switched to the contacts *m'* upon energization of a relay, for example, provided in the electric circuitry of the control circuit 9, so that the "right" and "left" signals can be reproduced by the playback heads PHR' and PHL' disposed in engagement with the second and fourth track T2 and T4 respectively.

As described above, in accordance with this invention, the magnetic tape transporting direction can be automatically reversed in accordance with cue signals, and thus reproduction can be made with respect to the second and fourth tracks subsequent to that with respect to the first and third tracks. In this case the recording mode of the cue signals is made different in respect of phase from that of the stereo-signals, so that even if the same frequency component as the cue signal is contained in the stereo-signal, such frequency component will never be taken out as cue signal unless such component is recorded 180° out of phase in two tracks. Practically, there is substantially no possibility that stereo-signal has the same frequency as that of the cue signal and yet it is recorded 180° out of phase in two tracks. This means that there is substantially no possibility that the tape transporting direction is reversed due to erroneous operation. Furthermore, the cue signals in the two tracks are additively reproduced so as to produce a high gain, which enables an accurate operation for the reversal of tape transportation to be performed. Such accurate operation can be insured by affording the cue signal frequency band-pass characteristic to the cue signal amplifier.

By providing the magnetic heads RHL and RHR for the recording and reproducing of the cue signals ahead of the playback heads PHL and PHR as shown in FIG. 1, it is possible to reverse the magnetic tape transportation prior to the reproduction of the cue signals by the playback heads PHL and PHR, thus preventing the cue signals from being mingled with the reproduced signal as noise. Of course, there is no possibility that the cue signals are mixed in the signals reproduced by the playback heads PHL' and PHR'.

Moreover, since the signal recording heads are also utilized to record and reproduce cue signals, it is not necessary to provide any separate magnetic head for cue signals. It is also possible that cue signal recording and reproducing heads are provided in juxtaposition with the signal recording heads, and that the connections between these heads during the recording and playback of the cue signals are made different from those during the recording of the stereo-signals.

Although, in the foregoing, description has been made of the case where stereo-signals are recorded on a magnetic tape formed with four tracks and reproduced therefrom, it will be quite obvious to those skilled in the art that this invention can also be applied to the case where monaural signals are recorded on a magnetic tape formed with two tracks and reproduced therefrom. In such case, there are provided magnetic playback heads as well as magnetic record heads for the two tracks, a monaural signal is recorded in the first track by one of the magnetic record heads with the magnetic tape being transported in a first direction, a cue signal is recorded in the first track at a position where the recording ends up by connecting the two magnetic record heads in the same relationship as in the aforegoing embodiment, and subsequently a monaural signal is recorded in the second track by the other magnetic record head with the magnetic tape being transported in a second direction. In the playback, the first track is reproduced by the corresponding one of the playback heads, and the magnetic tape transporting direction is reversed when the cue signal is reproduced in the same relationship as in the foregoing example by the two magnetic record heads, so that the monaural signal in the second track is reproduced by the other playback head.

In the foregoing, description has been made of the case where the present system is applied in an attempt to reverse the magnetic tape transporting direction. However, it is also possible to control the interruption of tape transportation, the rewinding of the tape, the fast-forwarding of the tape, etc. by the reproduction of the cue signal recorded in such relationship as described with respect to the foregoing example. Such controlling mode will be readily apparent to those skilled in the art, and therefore detailed description thereof will be omitted.

Furthermore, by providing two magnetic heads either for the recording and playback of the cue signal or for the reproduction of the latter in addition to the magnetic record heads, it will also be possible to apply the present invention in case where the magnetic tape transporting direction is to be reversed in accordance with a pre-recorded cue signal thereby to continuously record signals in a plurality of tracks.

Although this invention has been described and illustrated in detail, it is to be understood that the same is by way of explanation and example only and is not taken by way of limitation, the spirit and scope of this invention being limited only by the terms of the appended claims.

What is claimed is:

1. An automatic tape recording and playback system comprising drive means for a magnetic tape, control means associated with said drive means to change the mode of operation of said drive means, said tape being arranged for recording a plurality of tracks thereon, each track being recorded in the direction opposite from the direction of recording on the next adjacent track, a separate magnetic recording-reproducing head engaging each of the tracks recorded in one direction, a separate playback head engaging each of the tracks for playing back information signals, a cue signal source, means for connecting said cue signal source to each of said magnetic recording-reproducing heads so that the cue signal is recorded on said tracks as two signals in out of phase relation, and means coupled to the recording-reproducing heads during playback to initiate operation of said control means upon engagement of said recording-reproducing heads with the recorded cue signals.

2. The system of claim 1 in which said recording-reproducing heads, during recording and producing of the cue signal, are connected in series relationship.

3. The system of claim 1 in which said cue signals during reproduction are superimposed on each other by the recording-reproducing heads before passing to said control means.

4. The system of claim 1 which includes a reversing means for reversing the drive means upon receipt of cue signals in said control means.

References Cited

UNITED STATES PATENTS

| | | | |
|---|---|---|---|
| 2,709,204 | 5/1955 | Holmes | 179—100.2 |
| 2,878,321 | 3/1959 | Davis | 179—100.2 |
| 3,420,966 | 1/1969 | Wright | 179—100.2 |

OTHER REFERENCES

Bick, John D.: "Crosstalk Cancellation In Multi-Channel Magnetic Recording System," RCA Technical Notes, No. 398, June 1960.

STANLEY M. URYNOWICZ, Jr., Primary Examiner

S. B. POKOTILOW, Assistant Examiner

U.S. Cl. X.R.

179—100.3